May 17, 1949.  J. H. REICHART  2,470,645
PORTABLE ELECTRIC BARBECUE
Filed Aug. 2, 1943  2 Sheets-Sheet 1
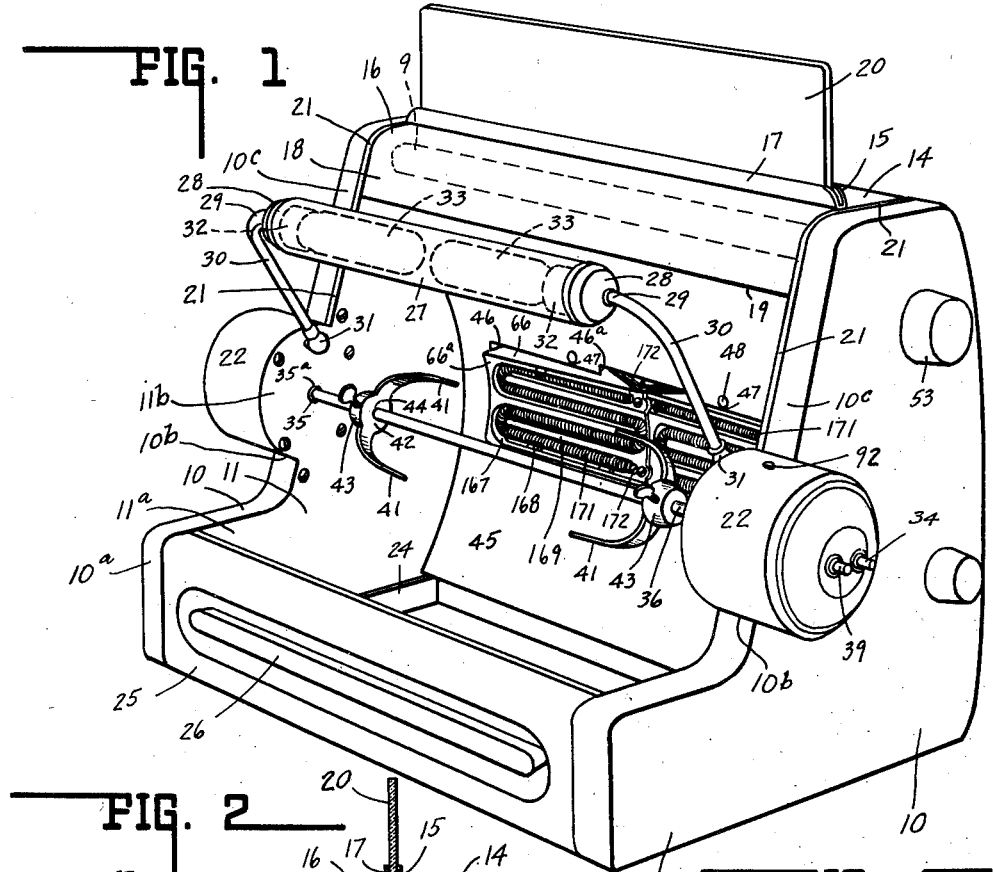
FIG. 1
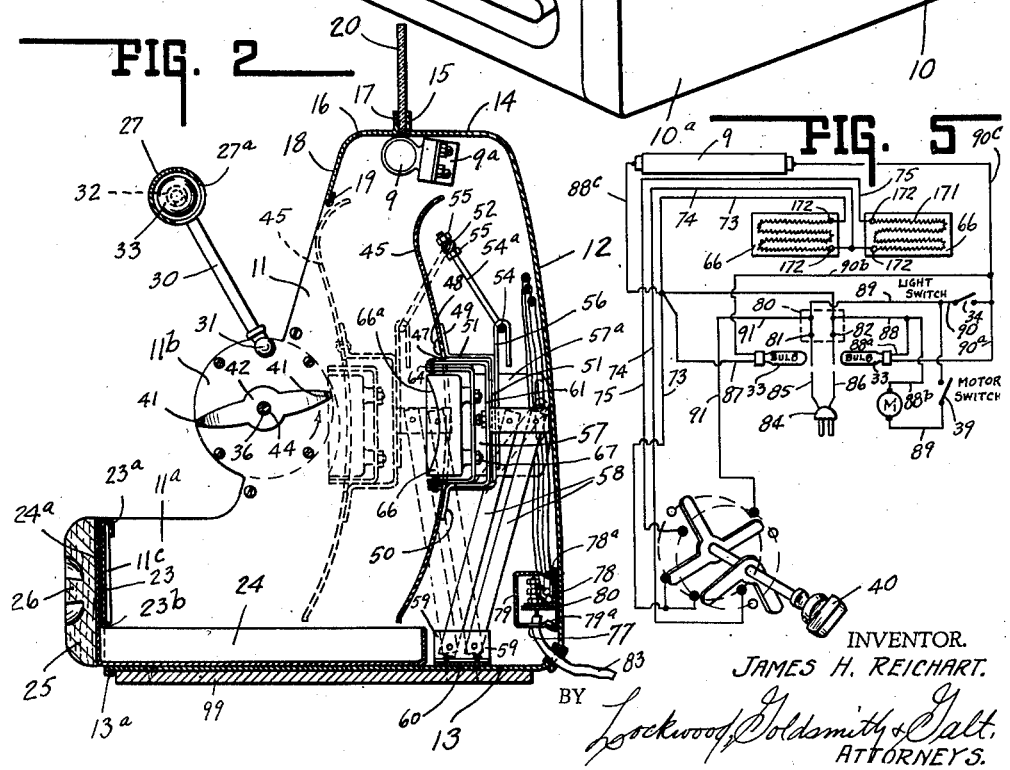
FIG. 2
FIG. 5
INVENTOR.
JAMES H. REICHART.
BY Lockwood, Goldsmith & Galt.
ATTORNEYS.

May 17, 1949.   J. H. REICHART   2,470,645
PORTABLE ELECTRIC BARBECUE
Filed Aug. 2, 1943   2 Sheets-Sheet 2
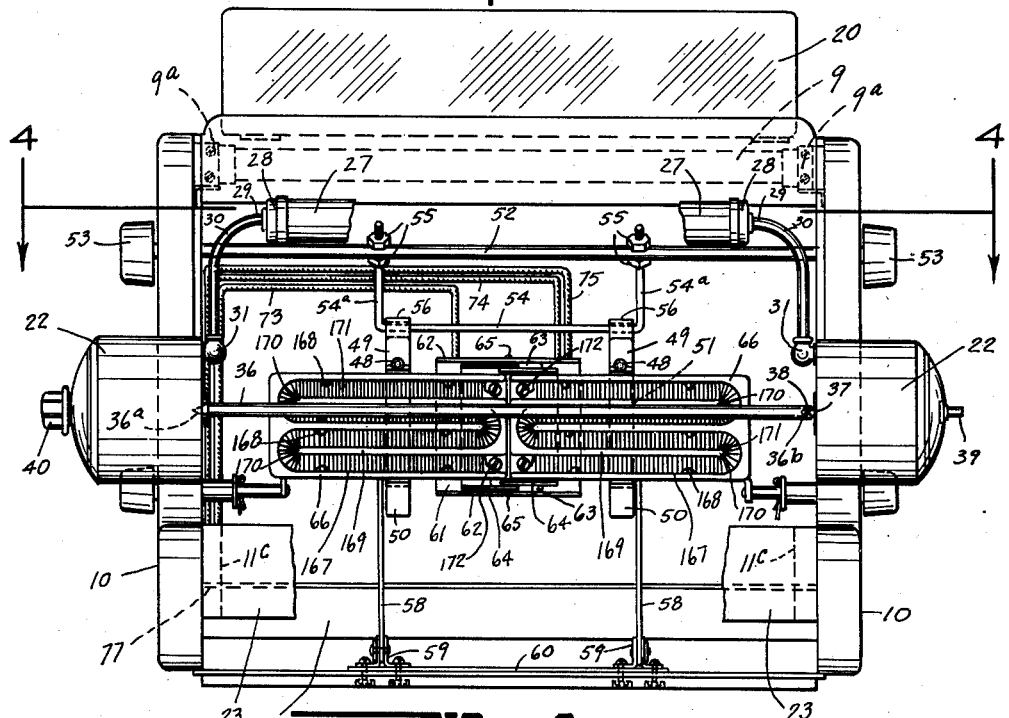
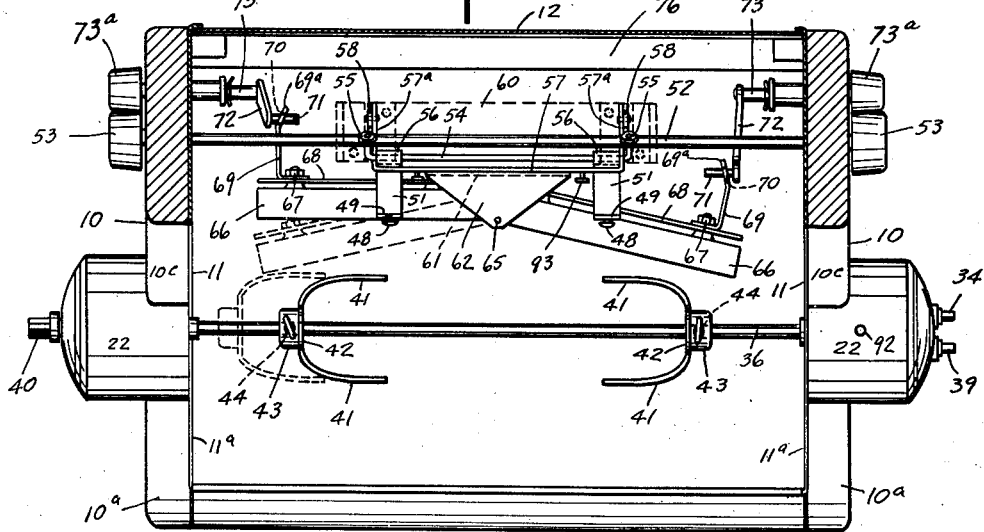
INVENTOR.
JAMES H. REICHART.

Patented May 17, 1949

2,470,645

UNITED STATES PATENT OFFICE 2,470,645

PORTABLE ELECTRIC BARBECUE

James H. Reichart, Muncie, Ind.

Application August 2, 1943, Serial No. 496,987

10 Claims. (Cl. 99—421)

This invention relates to a portable, electrically operated, barbecue device.

The chief object of this invention is to provide in a device of the character indicated, means for economically and efficiently barbecuing meat, fowl, fish, and the like, and which is capable of so functioning upon the edible product that during the cooking operation the product presents an exceptionally appetizing appearance.

Another object of this invention is to provide in a device of the character indicated, the respective parts necessary or desirable for efficient operation which are readily capable of adjustment for the respective purposes hereinafter set forth.

Other objects and features of the invention of which there are a considerable number, will be set forth more fully hereinafter.

The full nature of the invention will be set forth more fully in the accompanying drawings and the following specification and claims:

In the drawings, Fig. 1 is a perspective view of one embodiment of the invention, looking into the same and with all parts in the retracted or more remote positions, the article to be cooked being omitted from the spit.

Fig. 2 is a front to rear sectional view of the embodiment of the invention shown in Fig. 1, the full lines illustrating certain of the parts in the retracted position as shown in Fig. 1 and the dotted lines indicating certain of said parts in the extreme forward projected position.

Fig. 3 is a front elevational view of the embodiment of the invention shown in Figs. 1 and 2, with the drawer or tray removed and with the reflector and deflector removed and the forward cross member adjustable lamp structure being broken away to show the adjustable parts more in detail.

Fig. 4 is a horizontal sectional view taken on line 4—4 of Fig. 3 and in the direction of the arrows, the adjustable lamp being omitted for clearness.

Fig. 5 is a diagram of wiring connections.

Fig. 6 is an enlarged longitudinal section of the pointed end spit mounting bearing.

In the drawings 10 indicates each of two complementary side members, herein of wood, confronting faces of which are suitably recessed (not shown) for power supply line and the like reception. These recessed faces are covered by highly polished plates 11. Each of the aforesaid includes, near the bottom, forwardly projecting portions 10a and 11a, respectively.

A back plate 12, see Fig. 2, is provided that has a forwardly directed lower portion 13 that forms the bottom. An upper forwardly directed flange 14 forms a part of the top. It terminates at its forward edge in an upwardly directed flange 15.

Another upper portion 16 has at its rearward edge parallel flange 17. The forward portion 18 is turned downwardly and the lower edge is turned rearwardly and upwardly to form bead 19. The two flanges 15—17 form a groove to nest the lower portion of a display member 20, see Figs. 1 and 2. Narrow straps 21 bridge and mask the junctions between the sides 10—11 and the intervening top and back portions. Luminescent unit 9, carried by brackets 9a on sides 11, lies below the groove and illuminates the interior and display 20.

Each of the sides 10 approximately midway between the top and bottom is recessed at 10b on its inclined forward face 10c to seat cylindrical housings 22 that are secured to the conformation projecting portion 11b on the inside plate 11.

The forward edge of bottom 13 is directed downwardly and then rearwardly to form bead 13a. Connected at opposite ends to the forward edge flange 11c is front cross member 23, see Fig. 3, with rearwardly and downwardly directed upper bead formation 23a, see Fig. 2. This cross member terminates above bottom 13 at 23b to form an opening to pass tray 24 having an upwardly directed front extension 24a.

This forward portion of the tray carries the ornamental, wooden face or front 25 having finger engageable portion 26 formed in the forward face thereof. As shown in Fig. 2, this tray is quite shallow, but is of considerable depth from front to rear. All exposed tray interior surfaces are highly polished for heat reflection purposes. This also applies to the back, top and side plates as well.

A cylindrical tube 27 is recessed at 27a, see Fig. 2, and closed at each end as at 28, which end is connected to an axial end 29 of arm 30 pivoted at 31 upon the side plate. The end 29 mounts a lamp socket 32 which seats the elongated lamp bulb 33. Switch 34, see right hand end of Fig. 1, controls the energy supply to the lamps, each socket having its circuit wires enclosed within the tubular portions 28—29—30 and 31, and unit 9, supplied by wires nested in channels in sides 10 covered by plates 11.

Centrally of and to the left of the left hand plate portion 11b, see Fig. 1, and in registration with aperture 35a therein is a yieldingly mounted conically recessed bearing member, see also Fig. 6, the entire structure being slidably mounted within the left hand cylinder 22, with member 35 freely slidable therein. Member 35 has a cylindrical socket end 35b directed inwardly as a conical extension 35c. A spit 36 has a pointed (conical) end 36a, see Figs. 3 and 6. The conical end 36a mates with socket portion 35c, while the cylindrical portion 36 seats in socket portion 35b. This prevents cam action separation when the spit is loaded and rotated.

The spit opposite end is tubular and cross slotted as at 36b, see Fig. 3. A motor (not shown) and within the right hand cylinder 22 through a reduction drive (not shown) drives a drive shaft 37, see Fig. 3, with a cross pin 38 in the exposed end which projects through an aperture in the right hand plate portion 11b and similar to aperture 35a. The end of shaft 37 can be seated in the tubular end of the spit 36. The spit is mounted by inserting the pointed end into the conical socket and forcing same to the left an amount sufficient for the spit socketed end to clear the motor driven pinned end of shaft 37. When clear thereof and aligned therewith, the two are drivingly associated together, that is the pin 38 seats in the spit slot 36b. Shaft 37 and the conical socket constitute the sole and end supports for the spit.

A switch button 39, see right hand end Fig. 1, controls the motor and is of push button type, initial pressure closing the motor circuit for spit rotation. Subsequent pressure opens the switch and opens the motor circuit to stop spit rotation. Each cylinder 22 is of closed end type, that is cup-like, as illustrated. The left hand cylinder mounts a multiple position rotatable switch controlling finger piece 40. As this member is progressively rotated into successive positions, of which there are four, certain heats for cooking purposes can be obtained as hereinafter pointed out.

The spit may adjustably support any suitable fork arrangement. Herein two forks are provided, each of which includes a U-shaped portion with prong arms 41 substantially parallel to each other and a central portion 42 that is rigid with hub 43, same being elongated axially. Both are apertured at 44 for spit mounting. A wing bolt set screw rigidly clamps the fork to the spit and in the axially and rotatably adjusted position. Of course, the spit in use is passed through the fowl, ribs, or ham, or roast to be barbecued, and the two forks cooperate therewith and together to hold securely the food upon said spit to insure bodily rotation of the food with spit rotation. Grease dripping from the food will collect in the tray and may be used for gravy, etc., as desired.

The illumination unit is swung upwardly and rearwardly toward front 18 when the spit and food is handled for mounting and demounting. During cooking and display periods it is lowered as shown in Figs. 1 and 2 to simultaneously illuminate the food and the display 20.

A reflector and deflector member is indicated at 45. It is almost as wide as the space between the side plates. Its lower edge just clears the upper edges of the tray sides and the rear end of the tray lies behind the member 45 when in retracted position, see full lines Fig. 2. When positioned forwardly it lies across the tray between the front and back thereof as shown by the dotted lines in Fig. 2. This member has a heighth that positions the upper edge just above the level of the lower beaded edge 19 of front 18, see dotted lines Fig. 2.

This member 45 is curved in cross-section with the lower end sloping forwardly and the upper end directed rearwardly. The center of the concavity is approximately at the level of the spit. This member is detachably mounted for cleaning purposes and access to and repair purposes upon other mechanism therebehind.

The member 45 has a central horizontally elongated opening 46 therein enlarged upwardly and downwardly at 46a and medianly for clearance purposes. Two vertical slots 47 provide mounting portions that cooperate with headed pins 48 carried by bearing portions 49. Spaced therebeneath are similar bearing portions 50. The mounting is such that the member 45 normally bears against all bearing portions. In reality portions 49 and 50 are connected together by the U-shaped portion 51. The forward face of member 45 is also highly polished for cleaning and heat reflecting purposes.

Extending across the device adjacent the top and immediately forward of the back and projecting through the sides and side plates is a member 52 that mounts on the two exposed ends the knobs 53. Rigid with rod member 52 is the U-shaped member 54 the arms 54a of which are threaded at the ends which pass through the rod 52. Adjusting nuts 55 accurately adjust the position of the cross bar portion of the U-shaped member.

Rigid with the median portion of each U-shaped member 51 is a strap 56 that at its upper end turns rearwardly and then downwardly an appreciable distance. This forms an elongated channel in which is seated the median portion of the U-shaped member 54. When the reflector 45 is positioned forwardly, see dotted lines Fig. 2, or rearwardly, see full lines Fig. 2, member 54 is at the top of the channels. When intermediately positioned member 54 is positioned midway down in the channels.

Rotation of either or both knobs 53 causes the reflector to advance or retreat toward or away from the spit and without appreciable change in elevation because of the support now to be described. Of course, the member does move in a slight arc.

A U-shaped strap 57 has rearwardly directed arms 57a and is secured to each of the U-shaped portions 51 forwardly thereof as shown in Fig. 4. To each arm 57a is pivoted the upper ends of a pair of parallel links 58. The lower ends are pivoted between the vertical flanges of angle members 59 carried by plate 60 secured to base 13. The foregoing insures accuracy of link mounting. Note plate 60, see Fig. 2, is midway between the extreme positions of links 58, hence the slight arc.

To the forward face of member 57 is rigidly secured a U-shaped member having base 61 and horizontally spaced triangular shaped arms 62. The base is apertured at 63 for current conductor accommodation. A pair of U-shaped members 64 have a nested relationship relative to each other and arms 62, see Fig. 3, the latter supporting pivotally supporting members 64 by pins, etc., 65.

Each U-shaped member 64 nests as it were one end of a ceramic block 66 secured thereto as at 67. The adjacent ends of the ceramic blocks thus can advance and retreat simultaneously and with the reflector member 45.

A plate 68 backs each block being secured therewith to U-shaped member 64. The block is suitably secured to the adjacent plate 68. To the other end is secured an angle member 69, the free ends 69a of which are slightly inclined towards each other, see Fig. 4. Each free, inclined end 69a includes a vertical slot 70 in which is mounted a pin 71 carried by arm 72 carried by short shaft 73 that is rotatably mounted in the side wall structure and on its outer projecting end mounts knob 73a.

Each knob controls its adjacent block for selective movement of the blocks. Thus both knobs can simultaneously move forwardly the remote ends of the blocks to arrange the blocks in V-arrangement, or either block may be so positioned with the other parallel to the back or slightly inclined thereto as desired, see Fig. 4. This means that the heating blocks can be positioned so as to conform in general to the outline of the food on the spit.

Each ceramic block 66, see Figs. 1 and 2, has a concave front face 66a. In said block is a horizontally directed sinuous channel 167 that is double U-shaped in plan. Projecting inwardly co-extensive with the front face 66a are heating element retaining projections 168, see Fig. 3. The intermediate walls 169 are lipped at the end as at 170. In said channel 167 and retained by said portions 168 and 170 is heating element 171, the same being of nickel chrome alloy heating type with ends secured to terminals 172.

These terminals extend rearwardly through the ceramic block and are insulated from all metal supports. Three wires, 73, 74 and 75, are connected to the four terminals 172. Conductor 74 is the common line which is only used when the left heating element is energized or both elements are in parallel for high heat.

These heat and electric insulated conductors extend to and enter a conduit 76 at 77. This conduit includes a channel member 78, see Fig. 2, with inwardly directed sides 78a. A reversely directed channel 79 with sides indented as at 79a has a slip fit and spring connection with channel 78.

Within this conduit structure, see Fig. 2, is suitably mounted a base plate 80 upon which is insulatably mounted terminals 81 and 82, see Fig. 5. Cord 83, see Fig. 2, terminates in a plug connection 84, see Fig. 5, with prongs for outlet reception. Lines 85 and 86 are connected to terminals 81 and 82, respectively. Line 73 connects directly to terminal 82. So does branch 87 to the left bulb. Line 88 also from terminal 82 connects to the right bulb by branch 88a and to the motor M by branch 88b. Branch 88c connects to light unit 9.

Return line 89 includes motor switch 39 and connects to terminal 81. Branch 90 includes switch 34 and line 90a leads to the right bulb and 90b to the left bulb and 90c to light unit 9. Line 91 leads also from terminal 81 to the heat control switch as do lines 73, 74, and 75 as well. This switch has four terminals. The rotor, see Fig. 5, thereof has four positions. One series of contacts includes three in one plane and another series includes two in a parallel plane, one contact of each series being electrically connected. The rotor in the first plane has three quadrant positioned electrically connected contacts, while in the second plane the rotor includes two 90° contacts electrically connected. One contact in each rotor arrangement is longitudinally aligned with another.

With this connection control the first switch position is "off" for both heating elements. The second position of the rotor connects both in parallel across the terminals 81 and 82 for high heat. The third position of the rotor connects only the left hand heating element across said terminals. The fourth position of the rotor connects both heating elements in series and across the terminals for low heating purposes.

Since the switch per se is conventional, it is not further illustrated other than as in Fig. 5, nor is it believed necessary to further describe the connections. In Fig. 5 the switch is shown in the "off" position.

Referring to Fig. 4 note hole 92. This is to permit oiling of the motor and the reduction device. Note also in Fig. 2 the axis of the spit is slightly higher than the horizontal center of the heating element concavity. This difference is slightly increased as same are retracted toward the back. This elevation insures element camming by the meat to prevent element or machine damage. Since the spit rotates counter-clockwise, see Fig. 2, the foregoing is important to prevent such damage when the elements are initially positioned immediately adjacent thereto the meat for efficient cooking thereof.

The heat is not only directly radiated to the meat as it is rotated, but the spit being higher, heat rising increases the heating effect thereon. Since the device's several surfaces are highly polished, stray heat is reflected to the meat as well. The meat may be rapidly barbecued at high heat and in the case of hams the butt may be to the left on the spit and the left element used for further cooking the butt portion and then low heat may be used for keeping the meat warm or finishing "off."

Heat applied to meat exudes grease and juice therefrom. For counter clockwise rotation (see Fig. 2) the previously heated meat portion always is elevating and receding from the heating elements so that the exuded grease and juices from such heated portion flow downwardly toward the then heating portion for self-basting of same as it were. Any surplus grease or juice drips to the tray. The rotation is so slow that substantially none of the liquid grease or juice is thrown from the meat by centrifugal force. Of course, some may "pop" and "spatter" but since the heat area is at the back of the meat, none is directed forwardly for the meat prevents the way. The bright finish permits ready cleaning of the several surfaces from time to time as required.

In Fig. 2 it will be noted that the path of the fork prongs just clears the heating blocks when fully projected. Tilting cannot occur when the blocks are fully projected. Also, as shown in Fig. 4, adjustable stop 93 limits the rearward position of the tiltable blocks on the movable carriage arrangement disclosed herein. Note that when heating elements are in a fully tilted position and the movable carriage arrangement is moved forward the element extremeties move backward simultaneously as the adjacent ends move forward and vice versa.

By way of further explanation, the motor speed reduction is about 1200 to 1 (actually 1152 to 1) which means slow rotation of the spit. The heating elements are of dull red heat type and the hot infra red rays therefrom are utilized for heating purposes, it having been ascertained that this dull red heat is more efficient than a brighter red or darker red or a black heat. The connective tissue of unconfined meats, etc., breaks down faster between 900° and 1200° F.

The advantages of heater position adjustment is obvious when it is pointed out that heat transfer is effected inversely proportional to the square of the distance between the heat source and article to be heated. Hence closer heater positioning means more efficient and faster cooking. The heating elements on high heat use about 1300 watts and the spit shaft speed is such that the largest piece that can be cooked on the device can be cooked in a reasonable time. Naturally smaller pieces will be cooked in shorter intervals.

Certain structural and operational features of the invention not specifically hereinbefore mentioned will now be set forth. It will be observed that the tiltable illumination unit serves as a blind or curtain for the deflector so that the top edge of the deflector is not noticed.

Referring to Fig. 2 the back and base are formed of a single sheet of metal that, instead of having a sharp corner, has a rounded corner, which prevents the collection of food particles at the junction, because such a curved corner is much easier to clean. Also, as shown in Fig. 2, secured to the base 13, there preferably is provided a panel 99 of plywood and this serves to rigidize the base 13 and makes it conform to the plywood panel and therefore it serves to maintain the base perfectly flat and this is highly desirable to facilitate the drawer tray insertion and removal. This also insures proper positioning of the cross member 60 so that the parallel linkage is accurately positioned and thus binding of the links at their lower ends and between the spaced angles 59 is substantially eliminated. Not only does this plywood serve as heat insulation, as it were, but it also, if it is 3/8" to 5/8" thick, provides sufficient stock into which the anchoring screws, etc., for the plate 60 may extend and be protected against marring any surface on which the device may rest.

While no feet are shown in Fig. 2, it is to be understood that rubber bumpers, etc., might be applied to the base panel whenever it is desired, or wherever required.

Another feature which does not appear in the drawings and has not been previously described is that the refractory block 66 is preferably finished in a dark glaze, the color being black because that does not show the stain when greases and juice spatterings from the meat fall upon them and because the blocks are hot the grease, etc., may burn. This glaze also makes these blocks easier to clean.

Furthermore, this glazed face materially assists in the reflection of heat rays from the heated element wires mounted in the channel in the block.

Furthermore, the supporting member 68 shown in Fig. 4 and slightly spaced from each of the blocks is preferably provided with a highly polished face that also reflects such heat discharged from the back of the block throwing it again forward and thus materially again increasing the efficiency of the resulting heating unit. With reference to the wiring conduit or panel shown clearly in Fig. 2, it will be clearly seen from the lower right hand corner thereof and from Fig. 3 from the bottom thereof that this highly polished channel-shaped member 79 also reflects heat rays forwardly, etc., and furthermore since it extends substantially co-extensive with the width of the device it protects all the wiring enclosed therein. Also, this outer channel member is yieldingly locked to the inner channel member by dropping the lower ridge or flange 79a into the lower flange 78a and then pressing downwardly and rearwardly the upper flange 79a, so as to seat it in and behind the upper flange 78a, thus yieldingly locking the two flanges together to form a conduit. In this connection it is to be observed that the outermost flange is notched as at 98 so as to permit the entrance of the cord 83 and the notching is employed so that it permits removal of the panel 79 without any movement of said cord 83.

In connection with the motor this is of shaded pole type and the reduction unit is rigid therewith. The hole 92, previously described, registers with oil ducts or rather an oil duct supply arrangement for lubricating the motor bearings and the reduction mechanism.

In Fig. 6 there is illustrated the yielding cone-shaped bearing that permits spit attachment and detachment. The spring structure of such bearing is sufficiently strong that the spit point will not be released accidentally in the rotation, for example, of a heavy piece of meat, because it is quite obvious that a heavy piece of meat would bear down on the bearing at the spit point contact therewith and attempt to function as a cam for retraction to the left, thus effecting spit release. This is prevented at 35b as described.

With regard to the reflector-deflector, it is observed that this is detachably mounted so that it may be readily removed to permit cleaning of the bottom and sides of the device and also to permit cleaning of the reflector itself when detached from the device. This deflector is in effect in cross section in the shape of an elongated ogee curve and this shape is provided, as shown in Fig. 2, so that whatever spatterings are deposited on the reflector, the same, if in sufficient amount to flow down the reflector, will naturally discharge into the drawer type tray.

It is to be further observed that when the reflector is fully retracted, either or both heat elements may be tilted by manipulating the knob 73a. If either or both knobs 53 are then rotated the entire carriage will be brought forward together with the reflector and in so doing the two heating units will be brought into alignment with their forward faces substantially conforming to the surface of the reflector. Having been brought forward when the reflector is again returned to the retracted position, the heating elements are simultaneously returned to the original tilted positions. If both heating units are horizontally aligned and the reflector moving knobs are actuated to move the reflector forward, the heating units simultaneously move forward therewith. The elements are thrown into nearly a fully tilted position when the reflector is moved backwards.

Other structural details incidental to wiring connections, permitting this tilting and reciprocating movements of the units are employed so that the wiring connections are not subject to strain, etc., thereby preventing same from crystallization and breakage.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A barbecue and like device including in combination an open face housing, a rotatable spit in the open face thereof and above the base of the housing, heating means in the housing rearwardly of the spit position, an open top drawer type tray conforming to and closing the lower front portion of the housing and positioned forwardly of as well as beneath the spit and extending into the housing an appreciable distance behind the spit, and a generally vertically directed and apertured deflector positioned rearwardly of the spit position and through the aperture of which said heating means is exposed, the lower end of the deflector terminating forwardly of the back of the drawer type tray and above the top of the sides thereof.

2. A barbecue and like device including in combination an open face housing, a rotatable spit in the open face thereof and above the base of the housing, heating means in the housing rearwardly of the spit position, an open top drawer type tray conforming to and closing the lower front portion of the housing and positioned forwardly of as well as beneath the spit and extending into the housing an appreciable distance behind the spit, a generally vertically directed and apertured deflector positioned rearwardly of the spit position and through the aperture of which said heating means is exposed, the lower end of the deflector terminating forwardly of the back of the drawer type tray and above the top of the sides thereof, and means for rotating the spit to advance the meat thereon upwardly and rearwardly toward the heating means for self-basting purposes, the deflector discharging into said tray.

3. A barbecue and like device including in combination an open face housing, a rotatable spit in the open face thereof and above the base of the housing, heating means in the housing rearwardly of the spit position, an open top drawer type tray conforming to and closing the lower front portion of the housing and positioned forwardly of as well as beneath the spit and extending into the housing an appreciable distance behind the spit, a generally vertically directed and apertured deflector positioned rearwardly of the spit position and through the aperture of which said heating means is exposed, the lower end of the deflector terminating forwardly of the back of the drawer type tray and above the top of the sides thereof, and means for rotating the spit to advance the meat thereon upwardly and rearwardly toward the heating means for self-basting purposes, the deflector discharging into said tray, the forward face of the heating means being concave with the horizontal center thereof slightly below the horizontal axial plane of the spit.

4. A barbecue and like device including in combination an open face housing, a rotatable spit in the open face thereof and above the base of the housing, heating means in the housing rearwardly of the spit position, an open top drawer type tray conforming to and closing the lower front portion of the housing and positioned forwardly of as well as beneath the spit and extending into the housing an appreciable distance behind the spit, a generally vertically directed and apertured deflector positioned rearwardly of the spit position and through the aperture of which said heating means is exposed, the lower end of the deflector terminating forwardly of the back of the drawer type tray and above the top of the sides thereof, and means for simultaneously moving the heating means and reflector toward and away from the spit.

5. A barbecue and like device including in combination an open face housing, a rotatable spit in the open face thereof and above the base of the housing, heating means in the housing rearwardly of the spit position, an open top drawer type tray conforming to and closing the lower front portion of the housing and positioned forwardly of as well as beneath the spit and extending into the housing an appreciable distance behind the spit, a generally vertically directed and apertured deflector positioned rearwardly of the spit position and through the aperture of which said heating means is exposed, the lower end of the deflector terminating forwardly of the back of the drawer type tray and above the top of the sides thereof, and means for simultaneously moving the heating means and reflector toward and away from the spit, the forward face of the heating means being concave with the horizontal center thereof slightly below the horizontal axial plane of the spit.

6. In a barbecue and like device including a housing, and a rotatable spit positioned forwardly relative thereto, the combination of articulated heating means in the housing and toward the rear thereof, said heating means including at least a pair of heating members pivotally mounted adjacent their adjacent ends, the remote ends being movable forwardly and rearwardly in the pivotal movement of the members, the pivotally mounted ends being movable forwardly and rearwardly, and means effecting the forward and rearward movement and pivotal movement, rearward and pivotal movement of the members simultaneously effecting relative forward movement of the adjacent ends thereof and vice versa.

7. A device as defined by claim 6 wherein there is provided a reflector within the housing and disposed rearwardly of the spit, the reflector having an aperture therein for simultaneously exposing the heating members, the heating members when longitudinally disposed being at least partially nested in the aperture and when the remote ends of the members are tilted towards each other the said remote ends are moved from the aperture.

8. A device as defined by claim 7 wherein means is provided for simultaneously moving the reflector and the heating members toward and away from the spit.

9. A barbecue and like device including in combination an open face housing, a rotatable spit in the open face thereof and above the base of the housing, heating means in the housing rearwardly of the spit position, and an open top drawer type tray conforming to and closing the lower front portion of the housing and positioned forwardly of as well as beneath the spit and extending into the housing an appreciable distance behind the spit, the tray being of a depth from front to rear at least sufficient in depth so that in all adjusted relative positions of spit and heating means the said tray always lies below the spit and below at least the forward portion of the said heating units wherein there is provided a substantially upright reflector positioned at the rear of the housing and rearwardly of the spit and having an aperture therein to accommodate the heating means, the latter being movable forwardly by the reflector aperture, the reflector having a forwardly directed lower portion always terminating forwardly of the rear of the tray, and means moving the reflector toward and away from the spit in accordance with the adjustment of the spacing between the heating means and the spit.

10. A device as defined by claim 9 wherein the heating means comprises a plurality of sections mounted for relative movement therebetween for conformance to food outline on the spit, and means for effecting such relative movement of the heating means sections, the first mentioned heating means moving means and the reflector moving means having conjoint operation and the sections, when movable relatively, having movement partially through the reflector aperture.

JAMES H. REICHART.

REFERENCES CITED

The following references are of record in the file of this patent:

UNITED STATES PATENTS

| Number | Name | Date |
|---|---|---|
| 811,859 | Marsh | Feb. 6, 1906 |
| 902,724 | Giovanna | Nov. 3, 1908 |
| 1,093,883 | Raillere | Apr. 21, 1914 |
| 1,476,215 | Pace | Dec. 4, 1923 |
| 1,541,472 | Born | June 9, 1925 |
| 1,588,530 | Currier et al. | June 15, 1926 |
| 1,630,644 | Troiel | May 31, 1927 |
| 1,667,988 | Richardson | May 1, 1928 |
| 1,677,177 | Drake | July 17, 1928 |
| 1,702,900 | Humphrey | Feb. 19, 1929 |
| 1,713,303 | Serrell | May 14, 1929 |
| 1,719,713 | Miller | July 2, 1929 |
| 1,740,729 | Garvis | Dec. 24, 1929 |
| 1,762,325 | Blair et al. | June 10, 1930 |
| 1,765,247 | Seegmuller | June 17, 1930 |
| 2,025,899 | Rhodes | Dec. 31, 1935 |
| 2,049,481 | Waterspiel | Aug. 4, 1936 |
| 2,059,666 | Thompson | Nov. 3, 1936 |
| 2,156,860 | Lucas et al. | May 2, 1939 |
| 2,160,953 | Berbeles | June 6, 1939 |
| 2,179,646 | Spartalis | Nov. 14, 1939 |
| 2,182,225 | Garvis | Dec. 5, 1939 |
| 2,211,024 | Nardin | Aug. 13, 1940 |
| 2,245,220 | Nelson | June 10, 1941 |
| 2,263,866 | Barber | Nov. 25, 1941 |
| 2,286,394 | Togut | June 16, 1942 |
| 2,317,426 | Wilson | Apr. 27, 1943 |

FOREIGN PATENTS

| Number | Country | Date |
|---|---|---|
| 815,396 | France | Apr. 12, 1937 |
| 197,533 | Switzerland | Oct. 17, 1938 |